(12) United States Patent
Lagares Corominas

(10) Patent No.: US 8,764,524 B2
(45) Date of Patent: Jul. 1, 2014

(54) TENDERIZING MACHINE FOR TENDERIZING PIECES OF MEAT

(75) Inventor: Narcis Lagares Corominas, Girona (ES)

(73) Assignee: Metalquimia, S.A. (ES)

(*) Notice: Subject to any disclaimer, the term of this patent is extended or adjusted under 35 U.S.C. 154(b) by 24 days.

(21) Appl. No.: 13/696,314

(22) PCT Filed: Feb. 25, 2011

(86) PCT No.: PCT/IB2011/000392
§ 371 (c)(1),
(2), (4) Date: Jan. 11, 2013

(87) PCT Pub. No.: WO2011/138642
PCT Pub. Date: Nov. 10, 2011

(65) Prior Publication Data
US 2013/0210327 A1    Aug. 15, 2013

(30) Foreign Application Priority Data

May 5, 2010   (EP) ..................................... 10380066

(51) Int. Cl.
*A22C 9/00*   (2006.01)
(52) U.S. Cl.
CPC ...................................... *A22C 9/004* (2013.01)
USPC ........................................................ 452/142
(58) Field of Classification Search
USPC ........................................ 452/141, 142, 174
See application file for complete search history.

(56) References Cited

U.S. PATENT DOCUMENTS

| 3,786,536 | A | * | 1/1974 | Deckert | 452/141 |
| 4,133,075 | A | * | 1/1979 | Collins | 452/142 |
| 4,612,682 | A |   | 9/1986 | Holz |   |
| 5,114,379 | A | * | 5/1992 | Prosenbauer | 452/142 |
| 7,331,849 | B2 | * | 2/2008 | Bifulco | 452/142 |
| 2007/0249274 | A1 |   | 10/2007 | Lagares Corominas |   |
| 2011/0084155 | A1 | * | 4/2011 | Ludwig et al. | 241/25 |

FOREIGN PATENT DOCUMENTS

| EP | 0286607 A1 | 10/1988 |
| ES | 8406161 A1 | 10/1983 |

* cited by examiner

*Primary Examiner* — Richard Price, Jr.
(74) *Attorney, Agent, or Firm* — Hess Patent Law Firm LLC; Robert J. Hess

(57) ABSTRACT

The invention relates to a tenderizing machine for tenderizing pieces of meat, the machine comprising a first tenderizing roller (1) rotating about a first axis (3) supported in a fixed position in a structure (51), a second tenderizing roller (2) rotating about a second axis (4) parallel to said first axis (3) and movably supported in said structure (51) with the possibility of being separated from the first axis (3) against the force of antagonist means due to the effect of the passage of the pieces of meat between said first and second tenderizing rollers (1, 2), and drive means for rotating the first and second tenderizing rollers (1, 2) in opposite directions comprising a first motor (5) operatively connected by means of a first mechanical transmission (7) to rotate the first tenderizing roller (1), and a second motor (6) operatively connected by means of a second mechanical transmission (8) to rotate the second tenderizing roller (2).

13 Claims, 5 Drawing Sheets

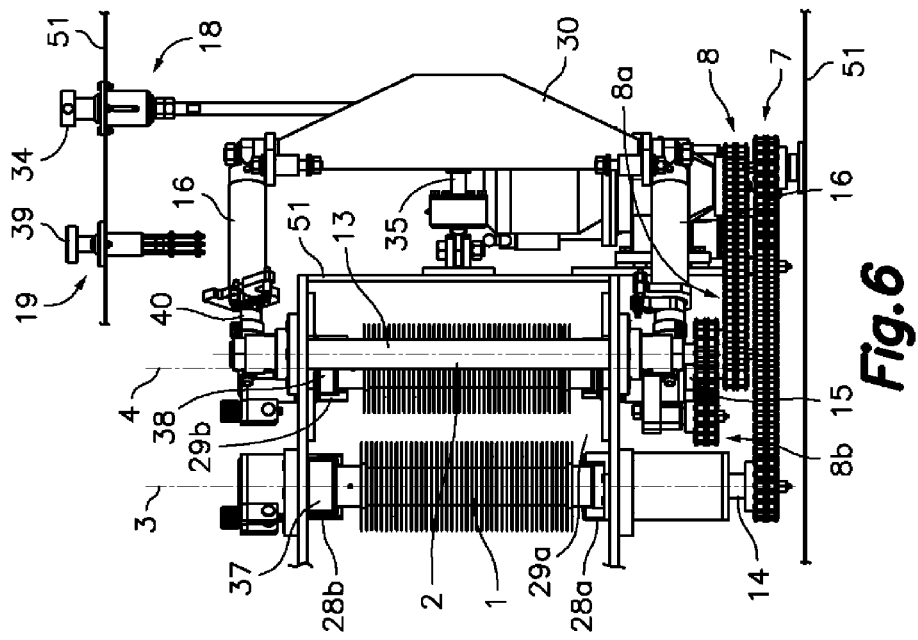
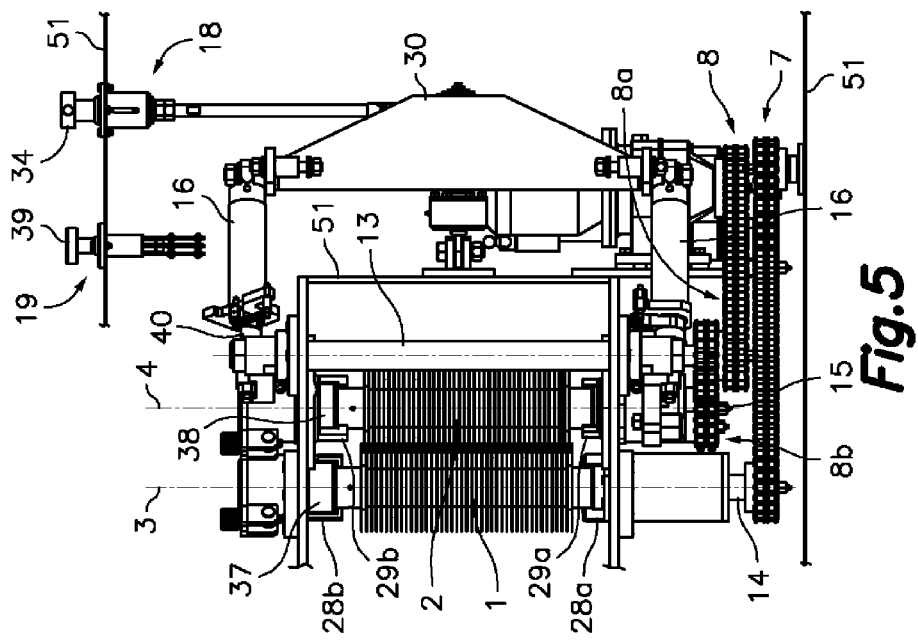

TENDERIZING MACHINE FOR TENDERIZING PIECES OF MEAT

TECHNICAL FIELD

The present invention relates to a tenderizing machine which has generally application in the food industry and more particularly in the meat industry for tenderizing pieces of meat.

BACKGROUND OF THE INVENTION

Patent EP-A-1690454 describes a tenderizing machine applicable to the treatment of pieces of boned meat comprising two superposed tenderizing assemblies, each of which comprises a pair of parallel tenderizing rollers having a plurality of cutting members such as prongs or blades emerging from their surfaces. The tenderizing rollers of each pair are rotatably assembled close to one another, defining between them an opening with adjustable width. One of the tenderizing rollers of each assembly is supported with the possibility of moving away from the other one, acting against antagonist means during the passage of the pieces of meat between both tenderizing rollers. The machine includes, for each of said tenderizing assemblies, means for individually regulating the distance between the two tenderizing rollers and means for selectively locking the position of the tenderizing roller capable of movement.

A single electric motor is operatively connected by means of a mechanical transmission to rotate the two tenderizing rollers of each pair in opposite directions, and said mechanical transmission is configured such that the rotational speeds of the two tenderizing rollers of each pair are unequal. By means of this construction, the ratio of rotational speeds of the two tenderizing rollers of each pair remains constant even though the rotational speed of the motor varies, unless the elements of the mechanical transmission are modified, and this is able to be improved since for different types of meat or for different treatments it may be convenient to vary the ratio of speeds between the two tenderizing rollers.

SUMMARY OF THE INVENTION

The present invention provides a tenderizing machine for tenderizing pieces of meat, comprising a pair of tenderizing rollers assembled such that they can rotate around respective parallel axes supported in a structure. The axis of one of the tenderizing rollers is supported in a fixed position while the axis of the other tenderizing roller is movably supported, with the possibility of being separated from the first axis against the force of antagonist means due to the effect of the passage of the pieces of meat between said first and second tenderizing rollers. The machine includes drive means for rotating the two tenderizing rollers in opposite directions, including a first motor operatively connected by means of a first mechanical transmission to rotate one of the tenderizing rollers, and a second independent motor operatively connected by means of a second mechanical transmission to rotate the other tenderizing roller.

Having two motors for separately driving the two tenderizing rollers makes it possible to independently vary the rotational speed of the tenderizing rollers. To that end, the machine includes control means for independently controlling the rotational speeds of said first and second motors. In a preferred embodiment, the motors are electric motors and said control means comprise at least one frequency variator and optionally a user interface to regulate said variable speed.

In another alternative embodiment, the motors can be of any type and the control means can include a gear shift or a mechanical variator.

The control means are preferably configured to provide a variable speed to one of the motors while the other motor rotates at a constant speed, although optionally both motors can be controlled at variable speeds. The tenderizing roller supported in a movable position is preferably the one that rotates at a constant speed and the control means control the first motor such that the tenderizing roller supported in a fixed position rotates at a variable speed, although the reverse is also possible.

BRIEF DESCRIPTION OF THE DRAWINGS

The foregoing and other features and advantages will be more fully understood from the following detailed description of an embodiment with reference to the attached drawings, in which:

FIG. 5 is a plan view of the tenderizing rollers, their support means and their drive means in a position of minimum separation between the tenderizing rollers; and FIG. 6 is a plan view of the tenderizing rollers, their support means and their drive means in a position of maximum separation between the tenderizing rollers.

DETAILED DESCRIPTION OF AN EMBODIMENT

Figure 1:
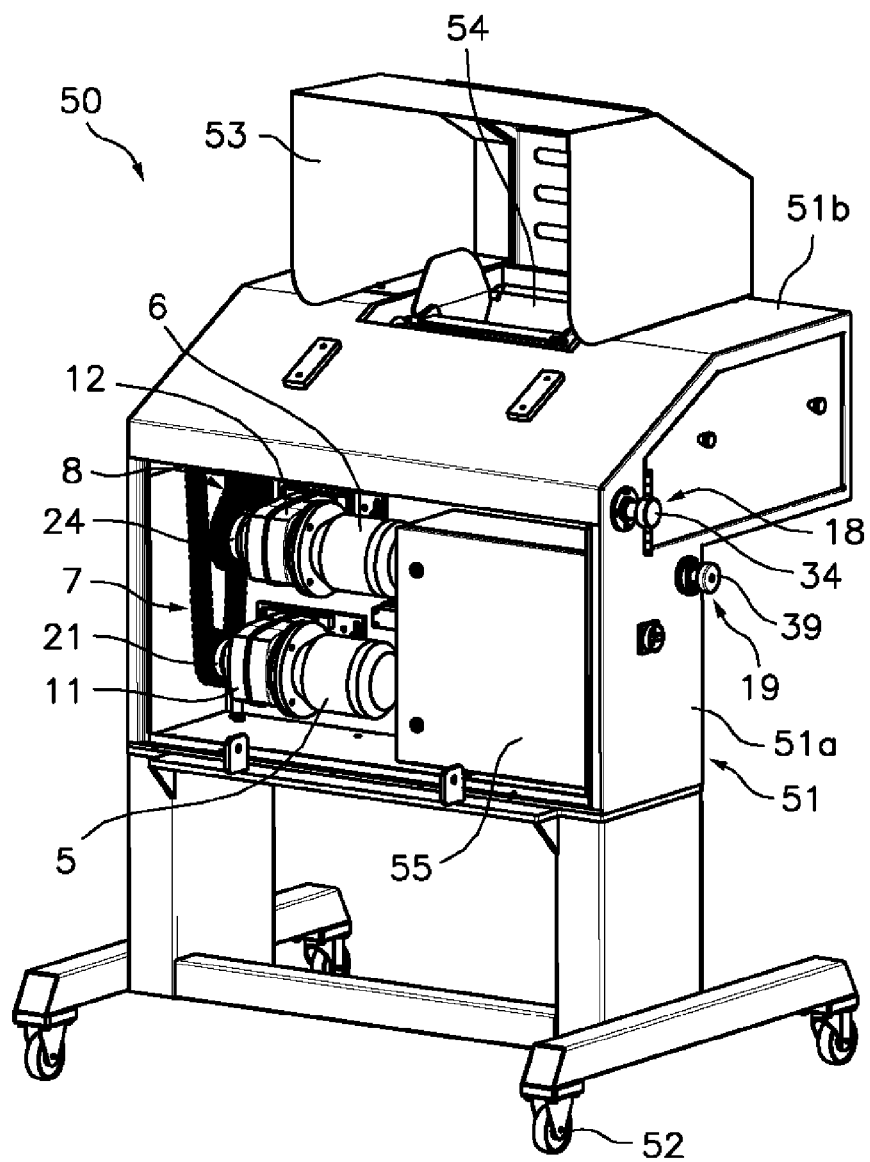
FIG. 1 is a perspective view of a tenderizing machine for tenderizing pieces of meat according to an embodiment of the present invention, with a cover removed to show part of its interior.
Figure 2:
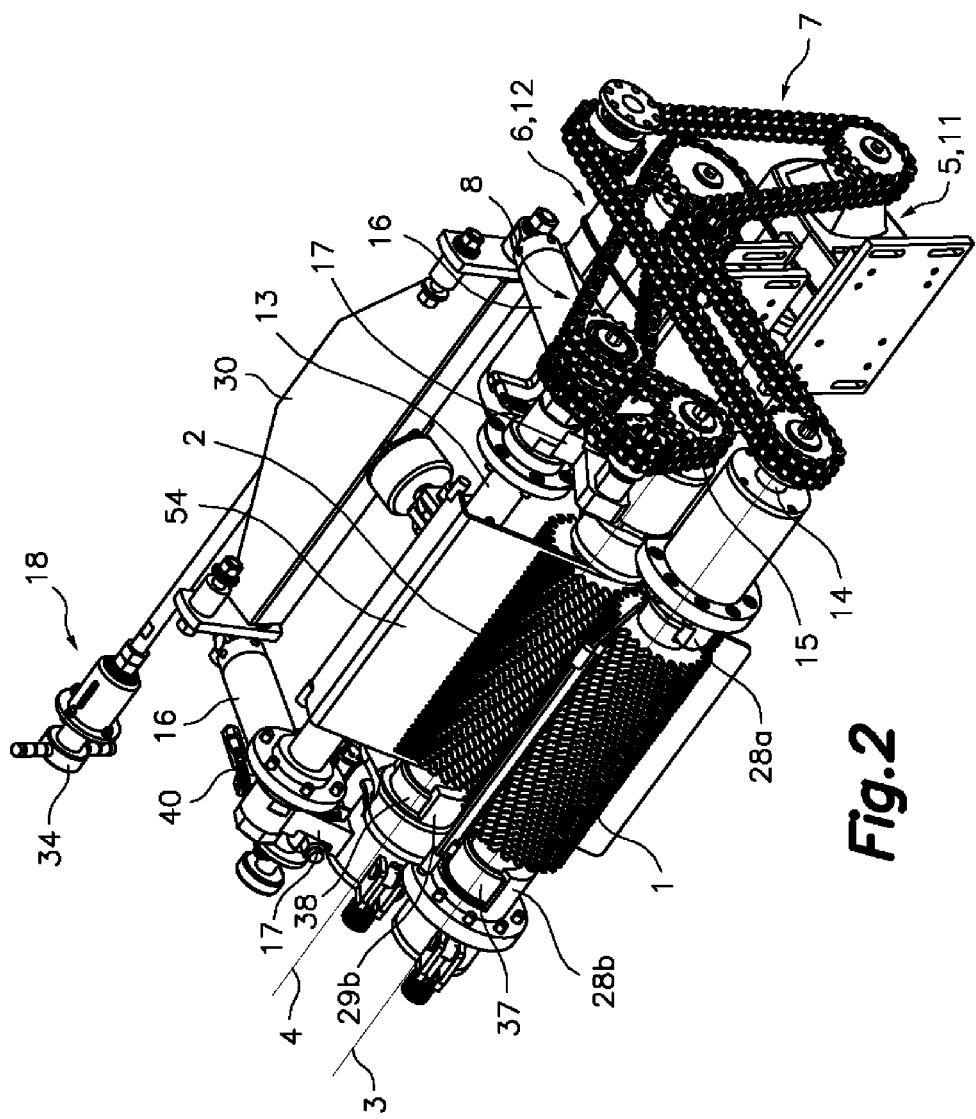
FIG. 2 is a perspective view of a part of the tenderizing machine of FIG. 1 including tenderizing rollers, their support means and their drive means.
Figure 3:
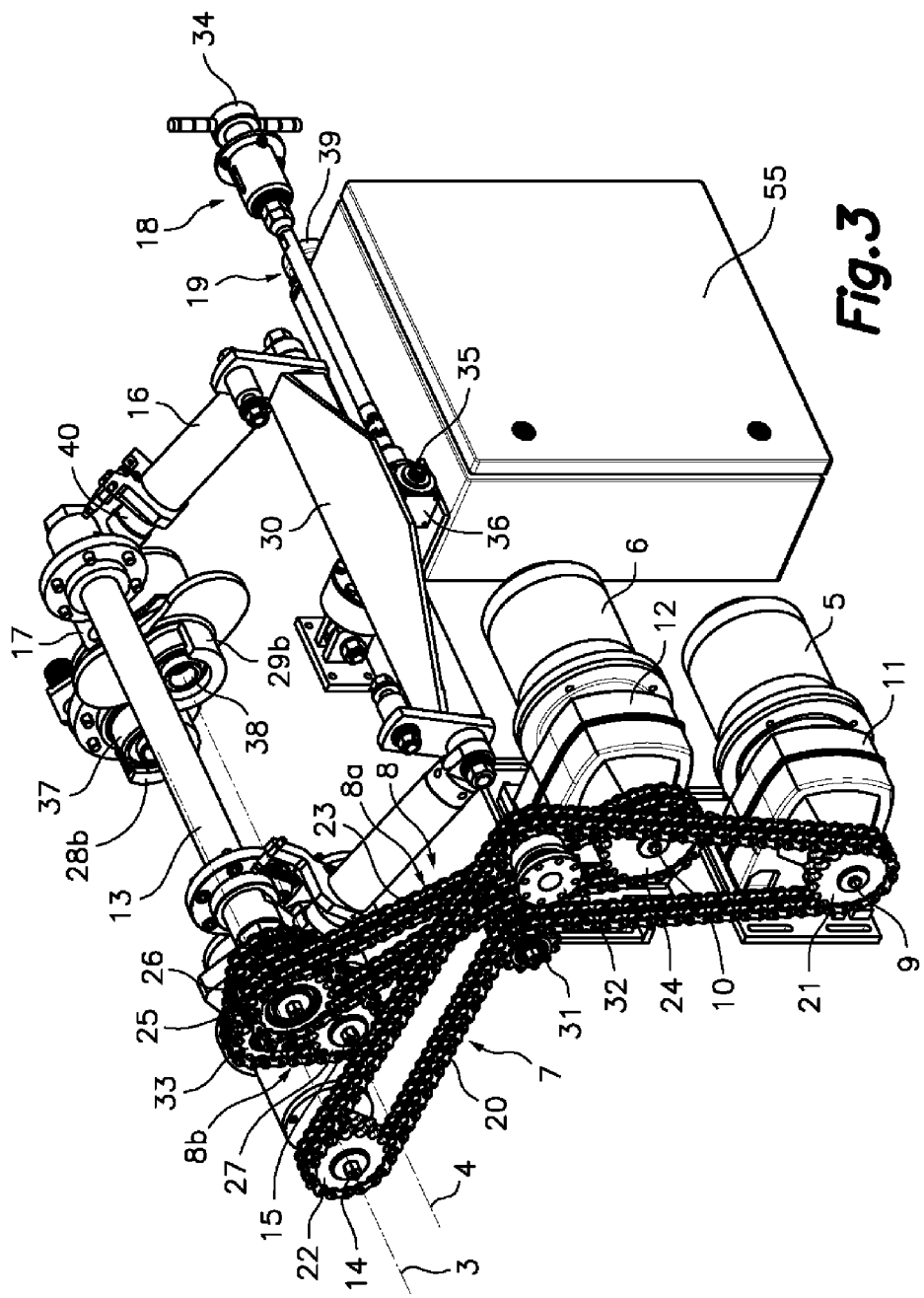
FIG. 3 is a simplified perspective view of the support means and drive means of the tenderizing rollers taken from the other side.
Figure 4:
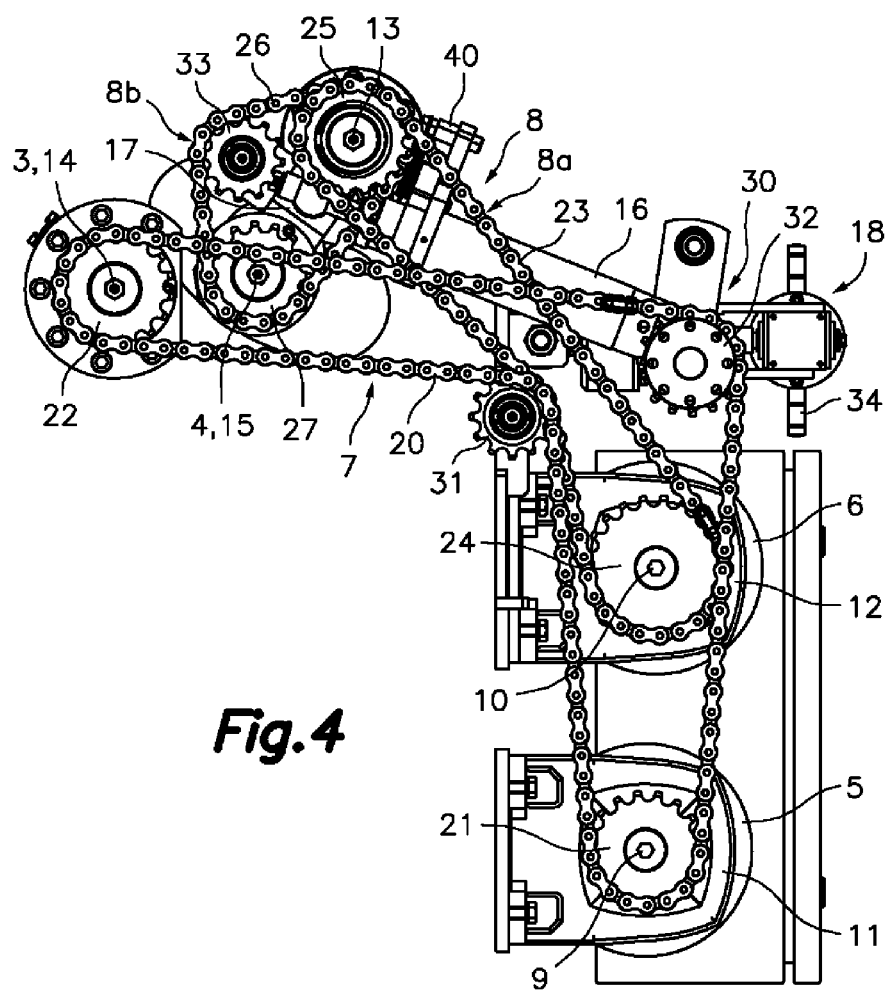
FIG. 4 is a side elevational view of the drive means of the tenderizing rollers.

First with reference to FIG. 1, reference number 50 generally designates a tenderizing machine according to an embodiment of the present invention, which is used for tenderizing pieces of meat in the meat industry. The mentioned tenderizing machine 50 comprises a structure 51 in which a pair of parallel tenderizing rollers 1, 2 (shown in FIGS. 2, 5 and 6) are rotatably supported, which rollers are driven to rotate in opposite directions by respective motors 5, 6. The tenderizing rollers 1, 2 have a plurality of cutting members projecting from their respective surfaces. The pieces of meat are passed between the tenderizing rollers 1, 2 such that they are compressed and drawn while at the same time receiving a large amount of small cuts. The two tenderizing rollers 1, 2 preferably rotate at different speeds different in opposite directions.

As is shown in FIG. 1, the structure 51 of the tenderizing machine 50 is assembled on wheels 52 having a vertical section 51a in which the motors 5, 6 are installed and a horizontal section 51b extending in a projecting manner from the vertical section 51a and in which the tenderizing rollers 1, 2 (not shown in FIG. 1) are installed. The mentioned horizontal section 51b of the structure 51 has an entrance 53 in the upper part, providing access to a funnel 54 (also shown in FIG. 2) arranged to direct the pieces of meat towards the tenderizing rollers 1, 2, and an exit in the lower part (not shown) through which the treated pieces of meat exit, which pieces can be collected in a container, conveyor belt or other means of removal placed under the horizontal section 51b of the structure 51.

Now in reference to FIGS. 2 to 6, the rollers comprise a first tenderizing roller 1 rotating about a first axis 3 supported in a fixed position in said structure 51 and a second tenderizing roller 2 rotating about a second axis 4 parallel to said first axis 3 and movably supported in the structure 51. The second tenderizing roller 2 is assembled such that it can be separated from the first tenderizing roller 1 against the force of antagonist means due to the effect of the passage of the pieces of meat between both tenderizing rollers 1, 2.

The drive means for rotating the first and second tenderizing rollers 1, 2 comprise a first motor 5 operatively connected by means of a first mechanical transmission 7 to rotate the first tenderizing roller 1, and a second motor 6 operatively connected by means of a second mechanical transmission 8 to rotate the second tenderizing roller 2. Furthermore, the tenderizing machine 50 comprises control means configured to independently control the rotational speed of at least one of said first and second motors 5, 6.

The first tenderizing roller 1 is supported at one end in a first drive shaft 14 and at the other end in a first guide pin 37, and a first releasable coupling device 28a, 28b is arranged to decouple and couple the first tenderizing roller 1 with respect to the first drive shaft 14 and with respect to the first guide pin 37. Similarly, the second tenderizing roller 2 is supported at one end in a second drive shaft 15 and at the other end in a second guide pin 38, and a second releasable coupling device 29a, 29b is arranged to decouple and couple the second tenderizing roller 2 with respect to the second drive shaft 15 and with respect to the second guide pin 38.

The first drive shaft 14 and the first guide pin 37 are aligned with the first axis 3, and the second drive shaft 15 and the second guide pin 38 are aligned with the second axis 4. The first and second releasable couplings 28a, 28b; 29a, 29b are a well known conventional type.

In the embodiment shown, the first and second motors 5, 6 are electric motors and said control means, which are housed in a cabinet 55, comprise at least one frequency variator and a user interface to regulate the rotational speed of the first motor 5 driving the first tenderizing roller 1 supported in a fixed position in the structure 51, while the second motor driving the second tenderizing roller 2 supported in a movable position is rotated at a constant speed. In an alternative embodiment (not shown), the first and second motors can be of any type and the control means comprise at least one gear shift or a mechanical variator to regulate the rotational speed of at least one of them.

The first motor 5 is coupled to a first reduction gear 11 having a first output shaft 9 in which a first driving pulley 21 is coupled. The first mechanical transmission 7 comprises a first roller chain 20 arranged to transmit the rotation from said first driving pulley 21 to a first driven pulley 22 coupled to the mentioned first drive shaft 14 of the first tenderizing roller 1. Thus, the first mechanical transmission 7 is configured to directly transmit the rotation from the first output shaft 9 to the first drive shaft 14 of the first tenderizing roller 1. The first roller chain 20 is supported on a pair of guide pulleys 31, 32, at least one of which can be moved in order to tense the first roller chain 20.

The second motor 6 is coupled to a second reduction gear 12 having a second output shaft 10 in which a second driving pulley 24 is coupled. The second mechanical transmission 8 comprises a primary transmission 8a to transmit the rotation from said second driving pulley 24 to an intermediate shaft 13, which is supported in a fixed position in the structure 51, and a secondary transmission 8b to transmit the rotation from said intermediate shaft 13 to the mentioned second drive shaft 15 of the second tenderizing roller 2, which, together with the mentioned second guide pin 38, is supported in pivoting arms 17 assembled such that they can pivot around the axis of the intermediate shaft 13.

Thus, the distance between the second output shaft 10 and the second drive shaft 15 of the second tenderizing roller 2 can be varied by the pivoting of said pivoting arms 17 around the intermediate shaft 13, while the distance between the second output shaft 10 and the intermediate shaft 13 and the distance between the intermediate shaft 13 and the second drive shaft 15 of the second tenderizing roller 2 remain constant, which simplifies the second mechanical transmission 8.

In the embodiment shown, the primary transmission 8a of the second mechanical transmission 8 comprises a second roller chain 23 arranged to transmit the rotation from the second driving pulley 24 to a first intermediate pulley 25 coupled to the intermediate shaft 13, and the secondary transmission 8b comprises a third roller chain 26 arranged to transmit the rotation from a second intermediate pulley coupled to the intermediate shaft 13 to a second driven pulley 27 coupled to the second drive shaft 15.

The second roller chain 23 is supported in a guide pulley the position of which can be varied to tense the second roller chain 23 and the third roller chain 26 is supported in a guide pulley 33 the position of which can likewise be varied to tense the third roller chain 26. Additionally, the positions of the first and second motor and reduction gear units 5, 11; 6, 12 can be varied to tense the first roller chain 20 of the first mechanical transmission 7 and the second roller chain 23 of the second mechanical transmission 8, respectively.

It will be understood that the roller chains 20, 23, 26 can alternatively be substituted with cogged belts without departing from the scope of the present invention.

The mentioned antagonist means comprise elastic elements 16 arranged between said pivoting arms 17 and the structure 51 to push the second tenderizing roller 2 towards the first tenderizing roller 1. More specifically, the elastic elements 16 are assembled on a movable support 30, which is connected to the structure 51 by regulating means 18 which allow varying the position of said movable support 30 with respect to the structure 51 between a position of minimum separation between the tenderizing rollers 1, 2 (FIG. 5) and a position of maximum separation between the tenderizing rollers 1, 2 (FIG. 6). The mentioned regulating means are conventional and comprise a handle 34 which can be operated to rotate, for example, a screw 35 (FIGS. 3 and 6) supported in the structure 51 and coupled to a nut 36 supported in the movable support 30 to regulate the distance between the first and second tenderizing rollers 1, 2 when they are not separated by pieces of meat passing between both.

The elastic elements 16 are of a well known conventional type and comprise a tubular case inside which there is arranged a coil spring or other equivalent elastic member which can be compressed by a plunger connected to a rod. The case is connected to the movable support 30 and the rod is connected to the corresponding pivoting arm 17.

The machine furthermore comprises locking means 19 arranged to lock the pivoting capacity of the pivoting arms 17 around the axis of the intermediate shaft 13 for the purpose of maintaining a selected fixed distance between the first and second tenderizing rollers 1, 2. In the embodiment shown, these locking means 19 comprise a knob 39 which can be operated to activate or deactivate locking devices 40 arranged to lock the movement of the rod with respect to the case of the elastic elements 16. The movement can be transmitted from the knob 39 to the locking devices 40 by means of a flexible mechanical transmission, such as the joint use of Bowden type cable and sheath assemblies (not shown) for example.

A person skilled in the art will consider modifications and variations based on the embodiments shown and described without departing from the scope of the present invention as it is defined in the following claims.

The invention claimed is:

1. A tenderizing machine for tenderizing pieces of meat, comprising a first tenderizing roller rotating about a first axis supported in a fixed position on a structure, a second tenderizing roller rotating about a second axis parallel to said first axis and movably supported in said structure with the possibility of being separated from the first axis against the force of antagonist means due to the effect of the passage of the pieces of meat between said first and second tenderizing rollers, and drive means for rotating the first and second tenderizing rollers in opposite directions, wherein said drive means comprise a first motor operatively connected by means of a first mechanical transmission to rotate the first tenderizing roller, and a second motor operatively connected by means of a second mechanical transmission to rotate the second tenderizing roller, wherein said second mechanical transmission comprises a primary transmission to transmit the rotation from a second output shaft of a second reduction gear coupled to the second motor to an intermediate shaft supported in a fixed position on the structure, and a secondary transmission to transmit the rotation from said intermediate shaft to a second drive shaft of the second tenderizing roller aligned with said second axis, wherein said second drive shaft aligned with the second axis is supported in pivoting arms pivotable around an axis of the intermediate shaft.

2. The machine according to claim 1, wherein control means are arranged to independently control the rotational speed of at least one of said first and second motors.

3. The machine according to claim 2, wherein said control means are configured to provide said variable speed to the first motor which drives the first tenderizing roller supported in a fixed position in the structure.

4. The machine according to claim 2, wherein the first and second motors are electric motors and said control means comprise at least one frequency variator.

5. The machine according to claim 4, wherein the control means include a user interface to regulate said rotational speed of at least one of the first and second motors.

6. The machine according to claim 2, wherein said control means comprise at least one mechanical gear shift or a mechanical variator.

7. The machine according to claim 1, wherein said first mechanical transmission is configured to directly transmit the rotation from a first output shaft of a first reduction gear coupled to the first motor to a first drive shaft of the first tenderizing roller aligned with the first axis.

8. The machine according to claim 7, wherein the first mechanical transmission comprises a first cogged belt or roller chain arranged to transmit the rotation from a first driving pulley coupled to said first output shaft to a first driven pulley coupled to said first drive shaft.

9. The machine according to claim 1, wherein said antagonist means comprise elastic elements arranged between said pivoting arms and the structure to push the second tenderizing roller towards the first tenderizing roller.

10. The machine according to claim 9, wherein said elastic elements are assembled on a movable support connected to the structure by regulating means which allow varying the position of said movable support with respect to the structure to regulate the distance between the first and second tenderizing rollers when they are not separated by pieces of meat passing between both.

11. The machine according to claim 10, wherein locking means are arranged to lock the pivoting capacity of the pivoting arms around the axis of the intermediate shaft for the purpose of maintaining a fixed distance between the first and second tenderizing rollers.

12. The machine according to claim 1, wherein said primary transmission of the second mechanical transmission comprises a second cogged belt or roller chain arranged to transmit the rotation from a second driving pulley coupled to said second output shaft to a first intermediate pulley coupled to the intermediate shaft, and said secondary transmission comprises a third cogged belt or roller chain arranged to transmit the rotation from a second intermediate pulley coupled to the intermediate shaft to a second driven pulley coupled to said second drive shaft.

13. The machine according to claim 1, wherein a first releasable coupling device is arranged to decouple and couple the first tenderizing roller with respect to the first drive shaft and a second releasable coupling device is arranged to decouple and couple the second tenderizing roller with respect to the second drive shaft.

* * * * *